US012769234B2

(12) United States Patent
Aramoto et al.

(10) Patent No.: US 12,769,234 B2
(45) Date of Patent: Oct. 20, 2026

(54) IMAGE FORMING APPARATUS INCLUDING FIXING SECTION HAVING PRESSURE ROLLER AND FIXING BELT, AND FIXING DEVICE HAVING PRESSURE ROLLER AND FIXING BELT

(71) Applicant: Konica Minolta, Inc., Tokyo (JP)

(72) Inventors: Naofumi Aramoto, Toyokawa (JP); Hirotaka Kanou, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/979,043

(22) Filed: Dec. 12, 2024

(65) Prior Publication Data

US 2025/0208546 A1 Jun. 26, 2025

(30) Foreign Application Priority Data

Dec. 25, 2023 (JP) ................................ 2023-217669

(51) Int. Cl.
*G03G 15/20* (2006.01)

(52) U.S. Cl.
CPC ....... *G03G 15/205* (2013.01); *G03G 15/2053* (2013.01); *G03G 15/2064* (2013.01); *G03G 2215/2032* (2013.01)

(58) Field of Classification Search
USPC .......................................................... 399/328
See application file for complete search history.

(56) References Cited

U.S. PATENT DOCUMENTS

2012/0243896 A1* 9/2012 Otsuka ................. G03G 15/205 399/70
2013/0251390 A1* 9/2013 Ishii ..................... G03G 15/205 399/69

FOREIGN PATENT DOCUMENTS

JP 2011-123235 A 6/2011
JP 2013-164451 A 8/2013

* cited by examiner

*Primary Examiner* — Quana Grainger
(74) *Attorney, Agent, or Firm* — LUCAS & MERCANTI, LLP

(57) ABSTRACT

A technique for eliminating creep of a fixing belt while shortening the warm-up operation time as much as possible is provided. An image forming apparatus includes a fixing section that fixes toner to a medium, and a controller that controls the fixing section. The fixing section includes a pressure roller and a fixing belt. The fixing belt nips the medium, together with the pressure roller, and causes the medium to be heated at a nip position where the medium is nipped. The controller estimates a temperature of the fixing belt at the nip position or in a vicinity of the nip position, from an operation history of the fixing section, and determines one or more parameters of a warm-up operation for heating the fixing belt, based on the temperature of the fixing belt at the nip position or in the vicinity of the nip position.

8 Claims, 10 Drawing Sheets

750

751 752 753 754

| CREEP ELIMINATION TIME | CREEP ELIMINATION DISTANCE | CREEP TIME [sec] | TEMPERATURE AT NIP POSITION |
|---|---|---|---|
| 8.7 | 1261.5 | 60 | 40 |
| 5.2 | 754 | 30 | 50 |

IMAGE FORMING APPARATUS INCLUDING FIXING SECTION HAVING PRESSURE ROLLER AND FIXING BELT, AND FIXING DEVICE HAVING PRESSURE ROLLER AND FIXING BELT

CROSS-REFERENCE TO RELATED APPLICATIONS

The entire disclosure of Japanese Patent Application No. 2023-217669, filed on Dec. 25, 2023, is incorporated herein by reference in its entirety.

BACKGROUND

Technological Field

The present disclosure relates to an image forming apparatus, and more specifically, to a technique for eliminating creep of a fixing belt.

Description of the Related Art

A toner-based image forming apparatus includes a fixing section (also referred to as "fixing device") for fixing an image to a medium. The fixing section rotates a fixing belt heated by a heater. The medium is nipped and conveyed by the fixing belt and a pressure roller. At this time, toner on the surface of the medium is melted, so that the image is fixed to the medium.

The fixing belt is stretched rotatably by a heating section and a pad. Furthermore, the fixing belt is curved with a high curvature at a position where the medium is nipped (hereinafter referred to as "nip position") or in the vicinity thereof. This is because a corner or a curved portion of the pad is located at the nip position or in the vicinity thereof. The fixing belt may also be distorted due to an influence of the nipping. When the image forming apparatus is in a sleep state or is powered off, the fixing belt is neither rotated nor heated. Therefore, the fixing belt having been distorted is kept as it is at the nip position or in the vicinity thereof. That is, creep of the fixing belt occurs. When the creep occurs, there is a possibility that an image defect occurs during the fixing process performed next and subsequent times. Accordingly, a technique for eliminating creep of the fixing belt is required.

Regarding the technique for eliminating creep of the fixing belt, for example, Japanese Laid-Open Patent Publication No. 2013-164451 discloses a fixing section and an image forming apparatus in which "when a position detection sensor outputs a signal (Low signal) that is output on the condition that a pressure roller serving as a pressure member is rotating and that a pressure force between a fixing belt serving as a fixing member and the pressure roller is equal to or more than a pressure force with which the fixing belt rotates together with the pressure roller, a controller serving as control means causes a halogen heater serving as a heat source to be energized with a predetermined power or more to heat the fixing belt" (see Abstract).

Another technique relating to the technique for eliminating creep of the fixing belt is disclosed, for example, in Japanese Laid-Open Patent Publication No. 2011-123235.

SUMMARY

To achieve at least one of the abovementioned objects, according to an aspect of the present invention, an image forming apparatus reflecting one aspect of the present invention is provided. The image forming apparatus includes: a fixing section that fixes toner to a medium; and a controller that controls the fixing section. The fixing section includes a pressure roller and a fixing belt. The fixing belt nips the medium, together with the pressure roller, and causes the medium to be heated at a nip position where the medium is nipped. The controller estimates a temperature of the fixing belt at the nip position or in a vicinity of the nip position, from an operation history of the fixing section, and determines one or more parameters of a warm-up operation for heating the fixing belt, based on the temperature of the fixing belt at the nip position or in the vicinity of the nip position.

The above and other objects, features, aspects and advantages of the present invention will become apparent from the following detailed description of the present invention which is to be understood in conjunction with the accompanying drawings.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
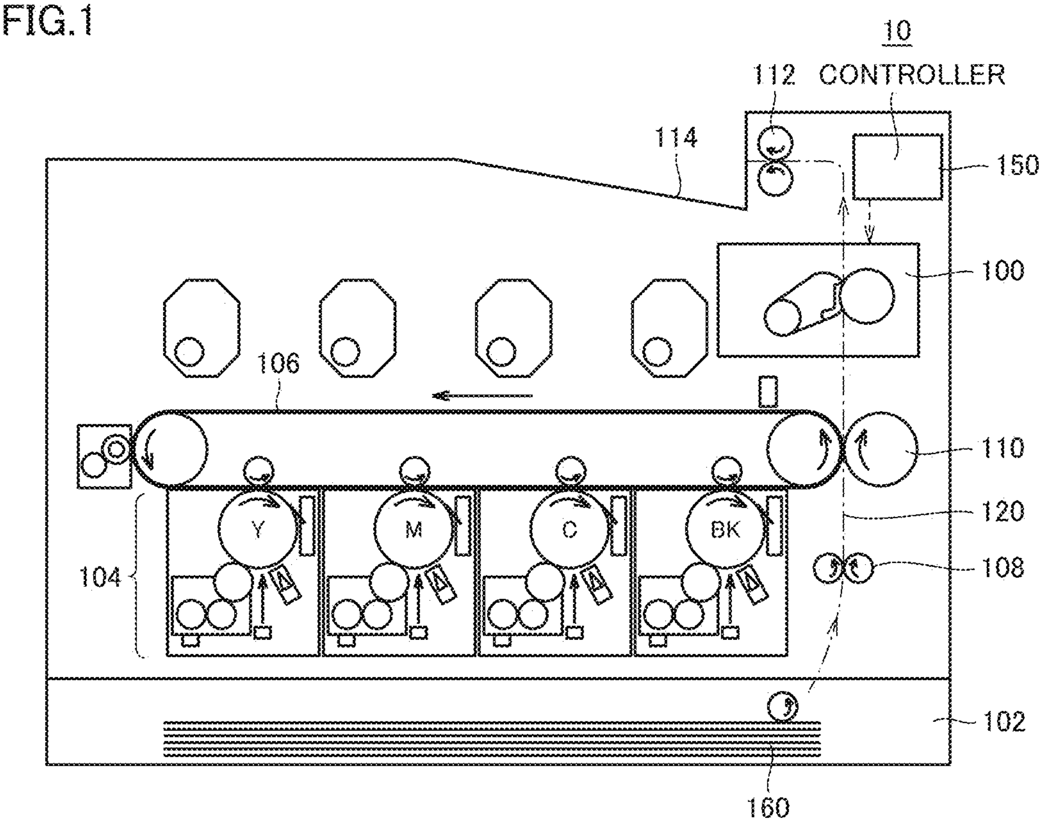
FIG. 1 is a diagram showing an example of a configuration of an image forming apparatus 10 including a fixing section 100 according to the present embodiment.

Hereinafter, one or more embodiments of the present invention will be described with reference to the drawings. However, the scope of the invention is not limited to the disclosed embodiments.

In the following, embodiments of the technical idea according to the present disclosure is described with reference to the drawings. In the following description, the same components are denoted by the same reference characters. Their names and functions are also the same. Therefore, a detailed description thereof is not herein repeated. Further, each embodiment, each modification example, each software configuration, each hardware configuration, each function, and each process, for example, may be selectively combined as appropriate.

A. Apparatus Configuration

FIG. 1 is a diagram showing an example of a configuration of an image forming apparatus 10 including a fixing section 100 according to the present embodiment. A description is given of components of the image forming apparatus 10 and roles of these components, with reference to FIG. 1. In addition, a general description is given of creep that occurs in a fixing belt included in the fixing section 100.

(a. Configuration of Image Forming Apparatus)

The image forming apparatus 10 includes, as main components, a sheet feed section 102, a developing section 104, an intermediate transfer belt 106, a conveyance roller 108, a transfer roller 110, a fixing section 100, sheet ejection rollers 112, a sheet ejection section 114, and a controller 150.

The sheet feed section 102 stores a medium 160 on which an image is to be printed. The medium 160 is conveyed from the sheet feed section 102 to the sheet ejection section 114 along a conveyance path 120. During this process, the image forming apparatus 10 performs the transferring process and the fixing process for a toner image onto the medium 160. In an aspect, the image forming apparatus 10 may include a plurality of sheet feed sections 102. In this case, a plurality of sheet feed sections 102 may store media 160 of different sizes or different types, respectively.

The developing section 104 forms a toner image in a single color. The image forming apparatus 10 may include a plurality of developing sections 104. The developing sections 104 form toner images in different colors, respectively. Typically, four colors of Y (yellow), M (magenta), C (cyan), and BK (black or key plate) are used. In an aspect, the image forming apparatus 10 may include a developing section(s) 104 for a color(s) other than YMCK. In another aspect, the image forming apparatus 10 may include five or more developing sections 104. Each developing section 104 forms a single-color toner image on the surface of a photoreceptor inside each developing section 104. In an example, the developing section 104 for yellow forms a yellow toner image on the surface of the photoreceptor. Similarly, the developing section 104 for magenta forms a magenta toner image on the surface of the photoreceptor. The developing section 104 for cyan forms a cyan toner image on the surface of the photoreceptor. The developing section 104 for black forms a black toner image on the surface of the photoreceptor.

The intermediate transfer belt 106 to which a toner image is transferred from each developing section 104 conveys the transferred toner image to the position of the transfer roller 110. More specifically, the single-color toner images formed by respective developing sections 104 are transferred to the intermediate transfer belt 106 in such a manner that the images are superimposed on each other. Thus, a full-color toner image may be formed on the surface of the intermediate transfer belt 106. Depending on the print job, a non-full-color image such as a monochrome image may be formed on the surface of the intermediate transfer belt 106. The intermediate transfer belt 106 is stretched over two rollers. The intermediate transfer belt 106 rotates to convey the transferred toner images to the position of the transfer roller 110.

The conveyance roller 108 is provided along the conveyance path 120. In an aspect, the image forming apparatus 10 may include a plurality of conveyance rollers 108. Each conveyance roller 108 conveys the medium 160 from the sheet feed section 102 to the sheet ejection section 114. A registration roller for adjusting conveyance timing of the medium 160 may be disposed upstream of the transfer roller 110.

The transfer roller 110 transfers the toner images on the intermediate transfer belt 106 to the surface of the conveyed medium 160. Then, the transfer roller 110 conveys the medium 160 onto which the toner images have been transferred, toward the fixing section 100.

The fixing section 100 heats the conveyed medium 160. More specifically, the fixing section 100 includes a heater, a pressure roller, and a fixing belt. The fixing belt is heated to a high temperature by the heater. The fixing belt having reached the high temperature nips the medium 160, together with the pressure roller. The toner on the surface of the medium 160 is temporarily melted by being nipped and heated, and then solidified. Thus, the image is fixed to the surface of the medium 160. Further, the fixing belt and the pressure roller rotate to convey the medium 160 toward the sheet ejection section 114. A more detailed configuration and variations of the fixing section 100 are described later herein with reference to FIGS. 2 and 3. The fixing section 100 may also be read as the fixing device. In an aspect, the fixing section 100 may be configured to be detachable from the image forming apparatus 10.

The sheet ejection rollers 112 output the medium 160 to the sheet ejection section 114. The sheet ejection section 114 is a place for ejecting the medium 160 on which the image is printed. The sheet ejection section 114 has a shape of a tray or the like, for example.

The controller 150 controls the entire image forming apparatus 10. In an aspect, the controller 150 may include a processor (not shown) for executing a program. Further, the controller 150 may include a memory (not shown) serving as a work space for the processor. Furthermore, the controller 150 may include a storage (not shown) for storing any program and data. The storage may be a ROM (Read Only Memory), a flash memory, or the like.

(b. Creep of Fixing Belt)

Next, a general description is given of creep (distortion) generated in the fixing belt. As described above, the fixing belt and the pressure roller nip the medium 160. The position at which the medium 160 is nipped is hereinafter referred to as nip position. The nip position may be a point, or may be a certain range where the fixing belt and the pressure roller nip the medium 160. The fixing belt is rotated by a force received from the pressure roller, for example, and is curved at the nip position or in the vicinity of the nip position.

It is assumed that the image forming apparatus 10 is in a sleep state or a powered-off state. In this case, the heater in the fixing section 100 is also powered off. Further, the fixing belt stops without rotating. As a result, the fixing belt is cooled and becomes hard. That is, the elastic modulus of the fixing belt is increased. As a result, the fixing belt having been curved at the nip position or in the vicinity thereof is kept as it is. The portion kept in the curved form is creep of the fixing belt. “Creep” herein covers distortion, warp, bend, deformation, and any phenomena that causes them. In an example, the creep of the fixing belt may also be read as distortion, warp, bend, or deformation, of the fixing belt.

The creep of the fixing belt is a cause of an image defect. Therefore, the image forming apparatus 10 performs a warm-up operation for resuming the fixing process from the sleep state or the powered-off state. The warm-up operation is an operation to keep the fixing belt rotating while turning on the heater, before the fixing process. As the fixing belt is heated for a certain time or more, the creep of the fixing belt is eliminated. However, when the time for the warm-up operation is too short, the creep of the fixing belt is not sufficiently eliminated. As a result, an image defect occurs in a printed image. On the contrary, when the time for the warm-up operation is too long, the creep of the fixing belt is eliminated, but it takes time to start the fixing process. As a result, convenience for users is lowered.

Therefore, the image forming apparatus 10 according to the present embodiment adjusts or determines one or more parameters of the warm-up operation, based on the temperature of the fixing belt at the nip position or in the vicinity thereof. In practice, the controller included in the image forming apparatus 10 controls various processes involved in the warm-up operation. The image forming apparatus 10 that performs the processes may also be read herein as the controller. The controller in this case is any one of the controllers 150, 270 (see FIG. 2), and 370 (see FIG. 3).

The one or more parameters include one or more of a target temperature of the fixing belt, a rotation distance of the fixing belt, a rotation speed of the fixing belt, and a rotation time of the fixing belt. The rotation distance of the fixing belt may also be read as a target rotation distance of the fixing belt. The rotation time of the fixing belt may also be read as a target rotation time of the fixing belt. Determining the one or more parameters includes determining a part or all of the one or more parameters. In an aspect, a parameter that is not determined by the image forming apparatus 10 or the controller, among the one or more parameters, may be a parameter having a fixed value. By adjusting or determining one or more parameters, the image forming apparatus 10 eliminates the creep more reliably than the related art. Further, the image forming apparatus 10 sets the time for the warm-up operation as short as possible.

(c. Structure of Fixing Section)

Next, variations of the structure of the fixing section 100 are described with reference to FIG. 2 and FIG. 3. In addition, the position where creep of the fixing belt occurs in each variation of the fixing section 100 is also described.

Figure 2:
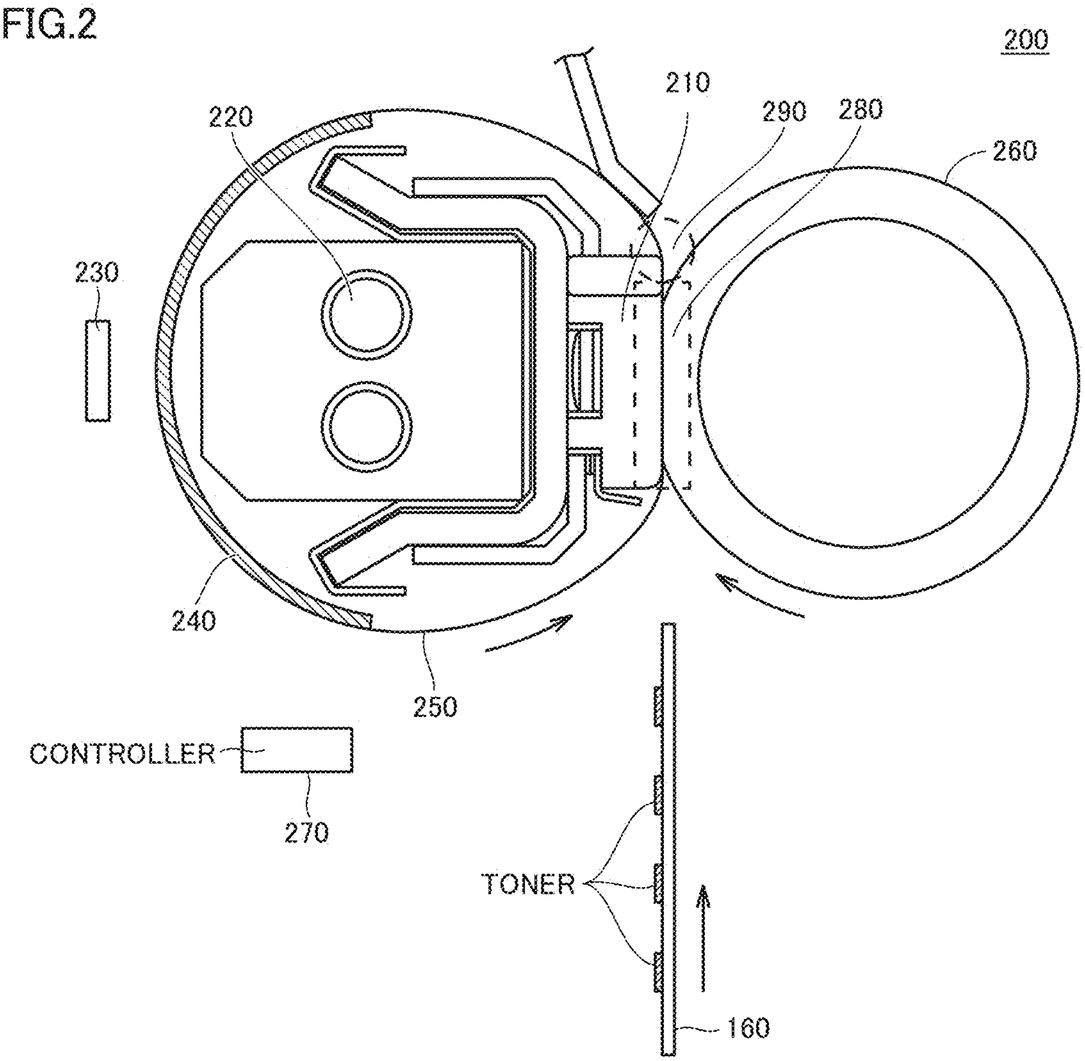
FIG. 2 is a diagram showing a first example of variations of the fixing section 100.

FIG. 2 is a diagram showing a first example of the variations of the fixing section 100. A fixing section 200 is an example of the variations of the fixing section 100. The fixing section 100 in FIG. 1 may be replaced with the fixing section 200. The fixing section 200 includes a pad 210, a heater 220, a temperature sensor 230, a heating section 240, a fixing belt 250, a pressure roller 260, and a controller 270.

The pad 210 supports the fixing belt 250. Further, the pad 210 presses the fixing belt 250 against the pressure roller 260. The pad 210 may be implemented by a material having a certain degree of flexibility, for example. The fixing belt 250 is caused to slide on the surface of the pad 210 by a force received from the pressure roller 260. In an aspect, the pad 210 may be a roller.

The heater 220 heats the fixing belt 250. More specifically, the heater 220 heats the heating section 240. The fixing belt 250 is heated by radiation from the heating section 240. In an aspect, the heater may be a halogen heater. The fixing section 200 may include one or more heaters 220, where the number of heaters may be any number.

The temperature sensor 230 detects the temperature of the fixing belt 250. The temperature sensor 230 outputs a signal indicating the detected temperature to the controller 270. The controller 270 may adjust the turn-on time of the heater 220 based on the acquired signal.

The heating section 240 transmits heat to the fixing belt 250. In an aspect, the heating section 240 may have a circular shape, a semicircular shape, or the like. In another aspect, the heating section 240 and the pad 210 may be integrally formed.

The fixing belt 250 nips the medium 160, together with the pressure roller 260. The fixing belt 250 rotates by sliding on the surfaces of the pad 210 and the heating section 240. In an aspect, the fixing belt 250 may be rotated by a force received from the pressure roller 260. In another aspect, the fixing belt 250 may be rotated by a force received from the pad 210 and/or the heating section 240.

The pressure roller 260 nips the medium 160, together with the fixing belt 250. In addition, the pressure roller 260 rotates to thereby rotate the fixing belt 250. Furthermore, when the pressure roller 260 is nipping the medium 160, the pressure roller 260 conveys the medium 160 toward the sheet ejection section 114. The medium 160 is nipped, at the nip position 280, by the fixing belt 250 and the pressure roller 260. The medium 160 passes through the nip position 280 to cause the image on the surface of the medium 160 to be fixed onto the medium 160.

The controller 270 controls the operation of the entire fixing section 200. In an example, the controller 270 may adjust the rotation speed of the pressure roller 260. In another example, the controller 270 may adjust the turn-on time and/or the temperature of the heater 220. Furthermore, the controller 270 may acquire a signal from the temperature sensor 230. In an aspect, the controller 270 may be the controller 150.

Referring to FIG. 2, the fixing belt 250 is distorted at the nip position 280. Furthermore, its curvature is larger in a vicinity 290 of the nip position 280. It is assumed that the image forming apparatus 10 enters a sleep state or the like and the heater 220 is turned off. In this case, at the nip position 280 and/or in the vicinity 290 thereof, the fixing belt 250 is kept in the distorted state. That is, creep of the fixing belt 250 occurs. Actually, the position where creep occurs in the fixing belt 250 varies depending on the shape, for example, of each component of the fixing section 200. In an example, creep of the fixing belt 250 may occur at the nip position 280. In another example, creep of the fixing belt 250 may occur in its vicinity 290. Furthermore, in still another example, creep of the fixing belt 250 may occur both at the nip position 280 and in the vicinity 290 thereof.

Figure 3:
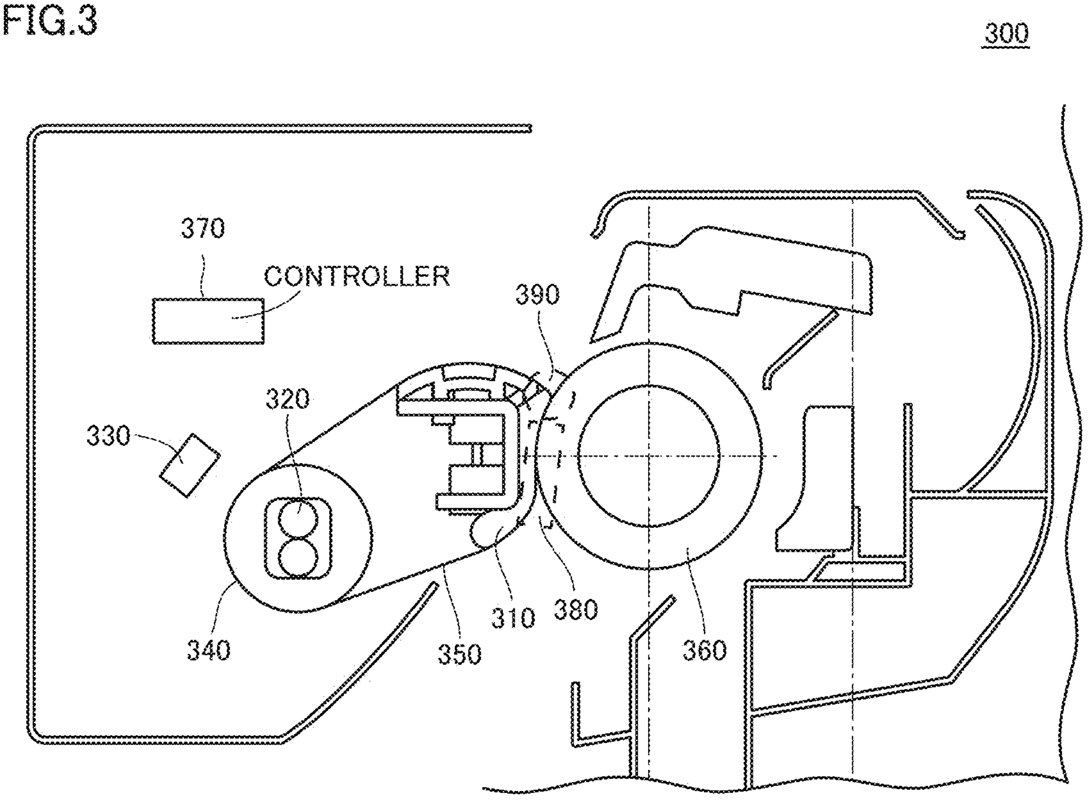
FIG. 3 is a diagram showing a second example of variations of the fixing section 100.

FIG. 3 is a diagram showing a second example of the variations of the fixing section 100. A fixing section 300 is an example of the variations of the fixing section 100. The fixing section 100 in FIG. 1 may be replaced with the fixing section 300. The fixing section 300 includes a pad 310, a heater 320, a temperature sensor 330, a heating section 340, a fixing belt 350, a pressure roller 360, and a controller 370.

The fixing section 300 basically includes the same components as those of the fixing section 200. The pad 310 corresponds to the pad 210. The heater 320 corresponds to the heater 220. The temperature sensor 330 corresponds to the temperature sensor 230. The heating section 340 corresponds to the heating section 240. The fixing belt 350 corresponds to the fixing belt 250. The pressure roller 360 corresponds to the pressure roller 260. The controller 370 corresponds to the controller 270.

The fixing section 300 also has the same function as that of the fixing section 200. Therefore, the function of the fixing section 300 is not herein described. Structural differences between the fixing section 300 and the fixing section 200 are described in the following.

Referring to FIG. 3, the pad 310 and the heating section 340 are located away from each other. The heating section 340 has a roller shape. In an aspect, the heating section 340 may or may not rotate. Furthermore, the pad 310 has a significantly different shape from the pad 210. As a result, the fixing belt 350 is sharply curved in a vicinity 390 of a nip position 380, that is, the curvature of the fixing belt 350 is high in the vicinity 390. Therefore, creep of the fixing belt 350 is likely to occur in the vicinity 390 of the nip position 380.

B. Mechanism of Occurrence of Creep of Fixing Belt

Figure 4:
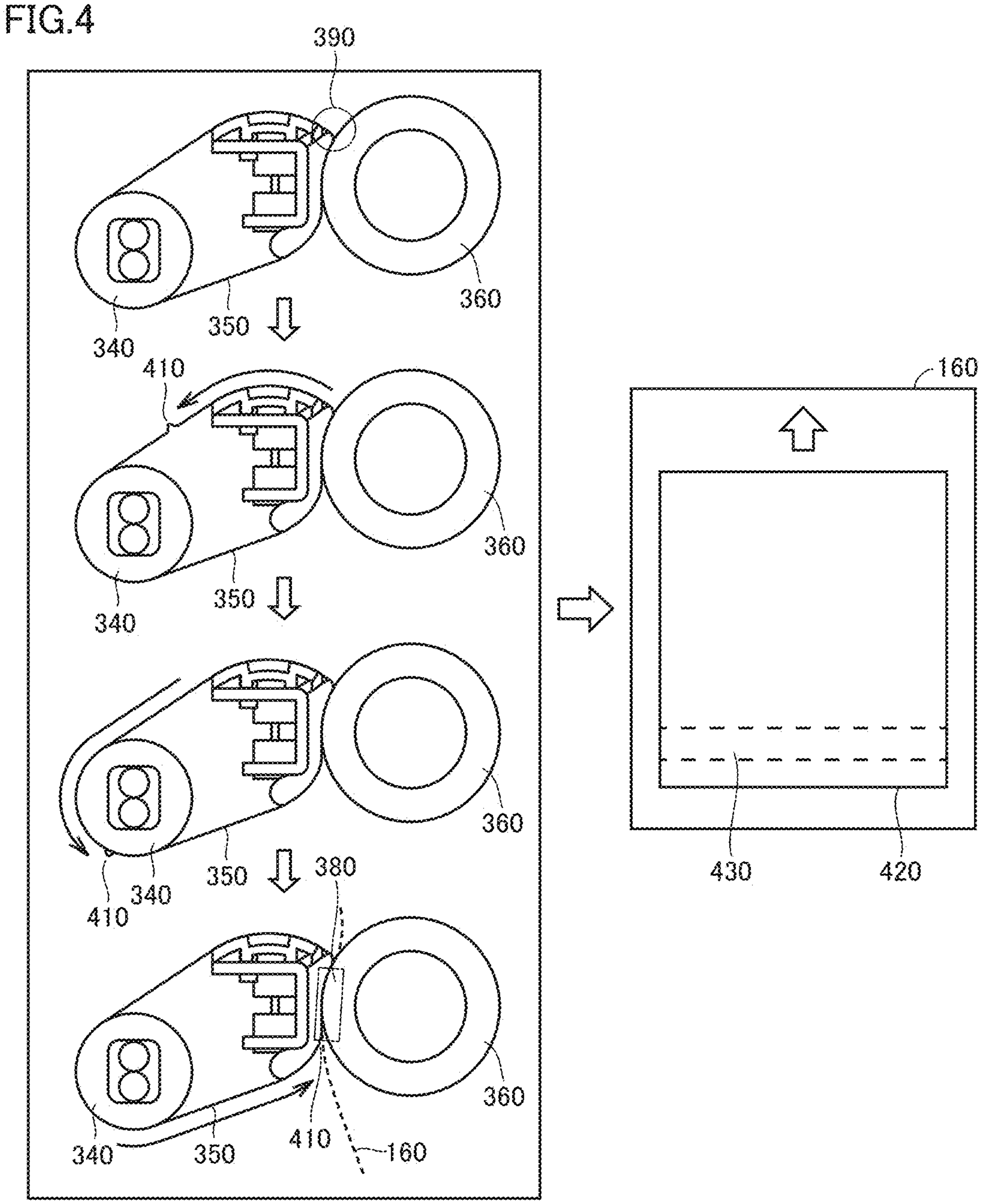
FIG. 4 is a diagram showing an example of how creep of a fixing belt occurs and an influence thereof.

FIG. 4 is a diagram showing an example of how creep of the fixing belt occurs and an influence thereof. With reference to FIG. 4, a description is given of an operation performed to the time when the fixing section 300 nips the medium 160, in the state where creep occurs. In addition, an image defect caused thereby is also described.

It is assumed that the fixing section 300 has been stopped for a certain period of time. In this case, creep 410 occurs at a position where the fixing belt 350 is curved to a large extent. Here, the creep 410 indicates a deformed portion of the fixing belt 350. Therefore, the creep 410 may also be read as a deformed portion or a warped portion of the fixing belt 350. In the example of FIG. 4, the creep 410 occurs in the vicinity 390 of the nip position 380.

Next, it is assumed that the fixing section 300 starts the fixing process without sufficiently performing the warm-up operation. In this case, as the fixing belt 350 rotates, the creep 410 is conveyed to the heating section 340. Since the creep 410 is a deformation, the creep is not in intimate contact with the heating section 340 and is not sufficiently heated.

As the fixing belt 350 further rotates in this state, the creep 410 passes through the nip position 380 without being sufficiently heated. It is assumed that the medium 160 passes through the nip position 380 in this state. In this case, an image defect occurs in a part 430 in an image 420 on the front surface of the medium 160. The part 430 is a portion of the medium 160 nipped by the portion of the fixing belt 350 where the creep 410 has occurred. While the cause of the creep and the influence thereof are described above with reference to FIG. 4 using the fixing section 300 as an example, the cause of the creep and the influence thereof in the fixing section 200 are similar them.

In the foregoing, it is described that the creep occurs at the nip position or in the vicinity of the nip position, which, however, is merely an example. Depending on the structure of the fixing section 100, the position at which nip of the fixing belt is likely to occur varies. “Nip position” and “vicinity of the nip position” herein also have a meaning that the possibility of occurrence of creep is high at the position/vicinity. Therefore, “nip position,” “vicinity of the nip position,” and “position where the possibility of occurrence of creep is high” may be read interchangeably.

The description “the temperature of the fixing belt” may also be read herein as “the temperature of the fixing belt at the nip position.” Further, the description “the temperature of the fixing belt” may also be read herein as “the temperature of the fixing belt in the vicinity of the nip position.” Furthermore, the description “the temperature of the fixing belt” may also be read herein as “the temperature of a position where the possibility of occurrence of creep of the fixing belt is high.”

Figure 5:
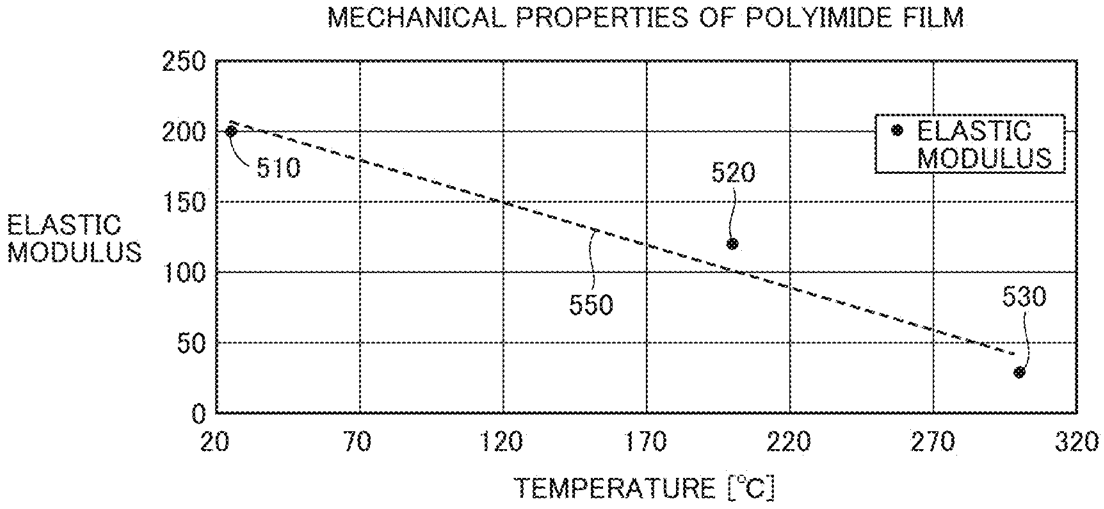
FIG. 5 is a diagram showing an example of a correlation between the temperature of the fixing belt and the elastic modulus of the fixing belt.

FIG. 5 is a diagram showing an example of a correlation between the temperature of the fixing belt and the elastic modulus of the fixing belt. As described above, decrease of the temperature causes increase of the elastic modulus of the fixing belt, which leads to occurrence of creep. In an example, a polyimide film may be used for the fixing belt. Points 510, 520, and 530 shown in FIG. 5 each indicate the elastic modulus of the polyimide film at the associated temperature. A graph 550 is a regression graph obtained from the points 510, 520, and 530. Referring to the graph 550, as the temperature of the polyimide film decreases, the elastic modulus of the polyimide film increases. It is assumed that a polyimide film is used for the fixing belt. In this case, it is seen that creep of the fixing belt is more likely to occur as the temperature is lower. On the contrary, creep of the fixing belt is more easily eliminated as the temperature is higher.

C. Adjustment of Parameters of Warm-Up Operation

Next, a method for adjusting parameters of the warm-up operation in the image forming apparatus 10 is described. As described above, creep occurs in a part of the fixing belt that has a higher curvature, when the temperature of this part decreases. However, as described above with reference to FIG. 5, the elastic modulus of the fixing belt is reduced by heating the fixing belt. Therefore, the image forming apparatus 10 can eliminate creep of the fixing belt by performing the warm-up operation for a sufficient period of time.

However, if the warm-up operation is excessively long, it takes time to start printing, which lowers convenience for users. On the contrary, if the warm-up operation is excessively short, creep is not eliminated and an image defect may occur in the printed image.

Therefore, the image forming apparatus 10 determines or adjusts one or more parameters of the warm-up operation, based on the temperature of the fixing belt. Thus, the image forming apparatus 10 eliminates creep more reliably than the related art. Further, the image forming apparatus 10 sets the time for the warm-up operation as short as possible.

As described above, the image forming apparatus 10 according to the present embodiment includes at least the following components and functions. The image forming apparatus 10 includes the fixing section 100 that fixes toner to the medium 160, and the controller that controls the fixing section 100. The controller may be any of the controllers 150, 270, and 370. The fixing section 100 includes at least the pressure roller and the fixing belt. The fixing belt nips the medium 160, together with the pressure roller, and is configured to cause the medium 160 to be heated at the nip position of the medium 160. The controller estimates the temperature of the fixing belt at the nip position or in the vicinity of the nip position, from an operation history of the fixing section 100. Further, the controller determines one or more parameters of a warm-up operation for heating the fixing belt, based on the temperature of the fixing belt at the nip position or in the vicinity of the nip position.

The fixing section 100 may also be provided as a fixing device that can be incorporated in the image forming apparatus 10. In this case, the fixing device includes a fixing belt for fixing an image to a medium 160 by heating the medium 160. The fixing device includes a fixing belt for fixing an image to a medium 160 by heating the medium 160. The fixing device also includes a pressure roller for applying a pressure to the medium 160. The fixing device also includes a controller for controlling the fixing device. The fixing belt nips the medium 160, together with the pressure roller, and is configured to be able cause the medium 160 to be heated at the nip position of the medium 160. The controller estimates the temperature of the fixing belt at the nip position or in the vicinity of the nip position, from an operation history of the fixing device. The controller also determines, based on the temperature of the fixing belt at the nip position or in the vicinity of the nip position, one or more parameters of a warm-up operation for heating the fixing belt.

In an aspect, the controller 150 may determine or adjust the one or more parameters. In another aspect, the controller 270, 370 of the fixing section 100 may determine or adjust the one or more parameters. Referring to FIGS. 6 to 9, a process of determining or adjusting one or more parameters of the warm-up operation is described in detail.

The operation history of the fixing section 100 may include at least one of a stoppage time and an operating time of the fixing section 100. The stoppage time and the operating time may each be a cumulative value. Further, the operation history of the fixing section 100 may include at least one of a turn-off time and a turn-on time of the heater. The turn-off time and the turn-on time may each be a cumulative value. Furthermore, the operation history of the fixing section 100 may be a count value of a timer of the controller. In an example, the controller may measure the stoppage time and/or the operating time of the fixing section 100 by means of a timer function, and store the measured value in a memory or the like. In another example, the controller may measure a turn-off time and/or a turn-on time of the heater by means of a timer function and store the measured value in a memory or the like.

Figure 6:
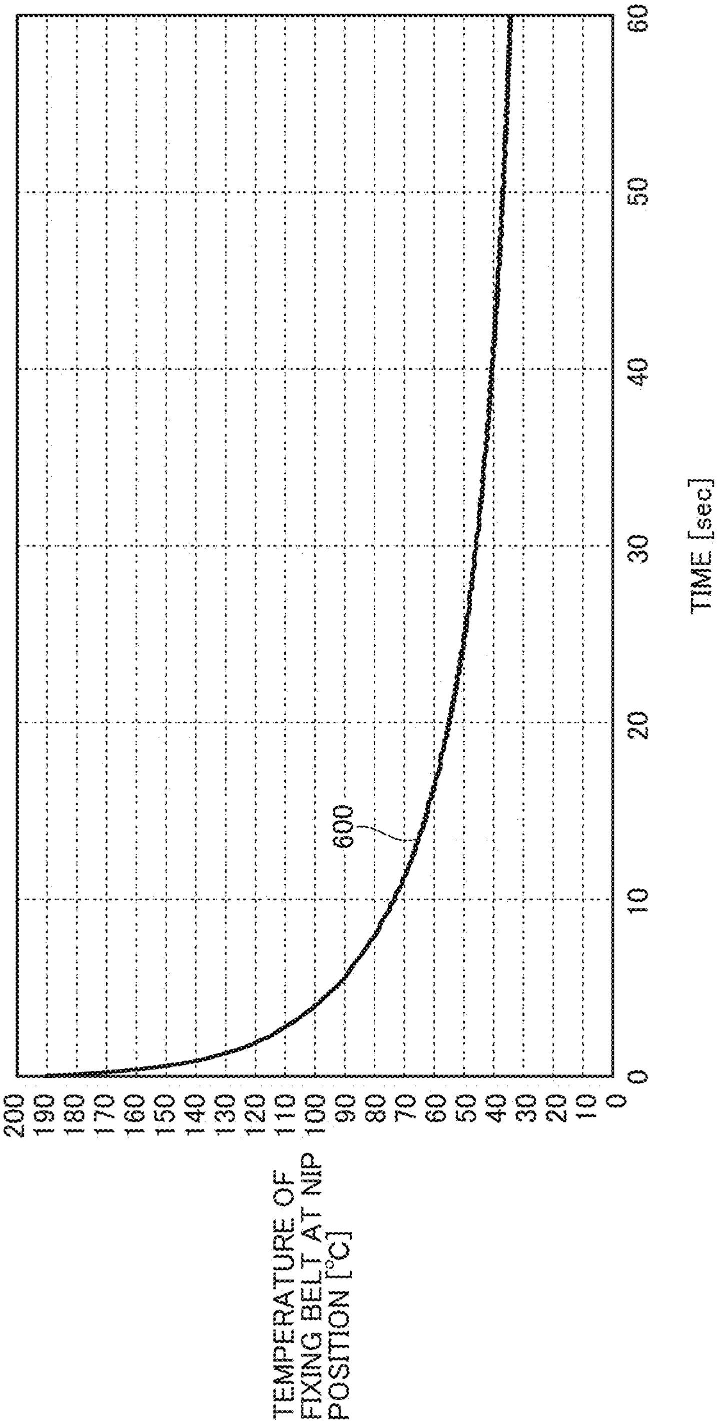
FIG. 6 is a diagram showing an example of a correlation between a stoppage time of the fixing section 100 and the temperature of the fixing belt at a nip position.

FIG. 6 is a diagram showing an example of a correlation between a stoppage time of the fixing section 100 and the temperature of the fixing belt at the nip position. The horizontal axis of a graph 600 represents elapsed time from stoppage of the fixing section 100. The vertical axis represents the temperature of the fixing belt at the nip position. Here, stoppage of the fixing section 100 means a state where the heater is turned off and rotation of the fixing belt is stopped. The graph 600 indicates a correlation between the stoppage time of the fixing section 100 and the temperature of the fixing belt at the nip position. The correlation indicated by the graph 600 is hereinafter referred to as "first correlation." With reference to the graph 600, it is seen that the temperature of the fixing belt at the nip position decreases as time elapses from stoppage of the fixing section 100. It is also seen from the above description of FIG. 5 that the elastic modulus of the fixing belt at the nip position increases as time elapses from stoppage of the fixing section 100.

The first correlation is determined in advance by an experiment. The image forming apparatus 10 may store data of the first correlation determined in advance, in a storage or the like in the image forming apparatus 10. The data of the first correlation may be expressed in any format. In an aspect, it is assumed that the temperature of the entire fixing belt is substantially uniform. In this case, the first correlation may be a correlation between the stoppage time of the fixing section 100 and the temperature of the fixing belt at any position. Further, "the fixing belt at the nip position" may also be read as "the fixing belt at any position" or simply as "the fixing belt."

In an aspect, the data of the first correlation may be expressed in any other format such as relational database's table, list, text, CSV (Comma Separated Values), or JSON (JavaScript (registered trademark) Object Notation). The image forming apparatus 10 may count the elapsed time from stoppage of the fixing section 100 by a timer counter or the like of the controller 150, 270, 370. Then, the image forming apparatus 10 may acquire the current temperature of the fixing belt at the nip position associated with the counted elapsed time, by referring to the data of the first correlation.

In another aspect, the image forming apparatus 10 may include a program for calculating the current temperature of the fixing belt at the nip position, from the elapsed time from stoppage of the fixing section 100. The program may be implemented as a program for executing an equation obtained by regression analysis of the data of the first correlation determined in advance by an experiment. The image forming apparatus 10 may count the elapsed time from stoppage of the fixing section 100 by a timer counter or the like of the controller 150. Then, the image forming apparatus 10 may calculate the current temperature of the fixing belt at the nip position by inputting the counted elapsed time to the program.

The first correlation described above with reference to FIG. 6 is merely an example. The image forming apparatus 10 need to include at least data of a correlation between the stoppage time of the fixing section 100 and the temperature of the position on the fixing belt where the possibility of occurrence of creep is high. With reference to FIG. 3 by way of example, the image forming apparatus 10 may include data of a correlation between the stoppage time of the fixing section 300 and the temperature of the fixing belt 350 in the vicinity 390 of the nip position 380. That is, "the temperature of the fixing belt at the nip position" in the first correlation may also be read as "the temperature of the fixing belt at the position where the possibility of occurrence of creep is high." Alternatively, "the temperature of the fixing belt at the nip position" in the first correlation may also be read as "the temperature of the fixing belt in the vicinity of the nip position."

As described above, the image forming apparatus 10 may acquire the current temperature of the fixing belt at the nip position from the data of the first correlation. Alternatively, the image forming apparatus 10 may acquire the current temperature of the fixing belt in the vicinity of the nip position, from the data of the first correlation. In any case, the image forming apparatus 10 may acquire, from the data of the first correlation, the current temperature of the fixing belt at the position where the possibility of occurrence of creep of the fixing belt is high.

That is, the image forming apparatus 10 may estimate the temperature of the fixing belt at the nip position or in the vicinity of the nip position, based on at least the stoppage time of the fixing section 100. This estimation operation is also explained as estimation of the temperature of the fixing belt at the nip position or in the vicinity thereof, from the operation history of the fixing section 100.

In an aspect, the image forming apparatus 10 may use a turn-off time for which the heater is turned off, instead of the stoppage time for which the fixing section 100 is stopped. That is, the image forming apparatus 10 may estimate the temperature of the fixing belt at the nip position or in the vicinity thereof, based on at least the turn-off time of the heater of the fixing section 100. This estimation operation is also explained as estimation of the temperature of the fixing belt at the nip position or in the vicinity thereof, from the operation history of the fixing section 100.

Figure 7:
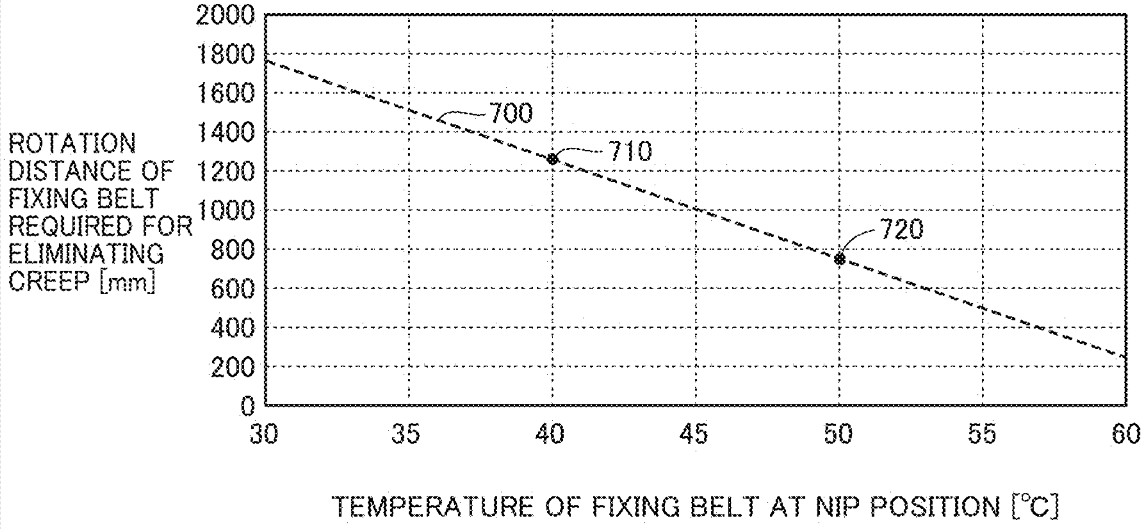
FIG. 7 is a diagram showing an example of a correlation between the temperature of the fixing belt at a nip position and the rotation distance of the fixing belt required for eliminating creep.

FIG. 7 is a diagram showing an example of a correlation between the temperature of the fixing belt at the nip position and the rotation distance of the fixing belt required for eliminating creep. The horizontal axis of a graph 700 represents the current temperature of the fixing belt at the nip position. In an aspect, the horizontal axis may represent the current temperature of the fixing belt in a vicinity of the nip position. In any case, the horizontal axis of the graph 700 represents the current temperature at a position where the possibility of occurrence of creep of the fixing belt is high. The vertical axis represents the rotation distance of the fixing belt required for eliminating creep. In an aspect, the vertical axis may represent the rotation time of the fixing belt required for eliminating creep. The graph 700 indicates a correlation between the temperature of the fixing belt at the nip position and the rotation distance required for eliminating creep. The correlation indicated by the graph 700 is hereinafter referred to as "second correlation." In an example, the temperature of the fixing belt at a point 710 is "40° C." The rotation distance required for eliminating creep at this time is "about 1250 mm." In another example, the temperature of the fixing belt at a point 720 is "50° C." The rotation distance required for eliminating creep at this time is "about 750 mm." From these examples, it is seen that the lower the temperature of the fixing belt is, the longer the rotation distance of the fixing belt required for eliminating creep is.

The second correlation is determined in advance by an experiment. The image forming apparatus 10 may store data of the second correlation determined in advance, in a storage or the like in the image forming apparatus 10. The data of the second correlation may be expressed in any format.

In an aspect, the data of the second correlation may be expressed in any other format such as relational database's table, list, text, CSV, or JSON. The image forming apparatus 10 may acquire the current temperature of the fixing belt at the nip position by referring to the data of the first correlation shown in FIG. 6. Alternatively, the image forming apparatus 10 may acquire the current temperature of the fixing belt in the vicinity of the nip position by referring to the data of the first correlation. In any case, the image forming apparatus 10 may acquire the current temperature at the position where the possibility of occurrence of creep of the fixing belt is high, by referring to the data of the first correlation. Then, the image forming apparatus 10 may acquire the rotation distance of the fixing belt required for eliminating creep associated with the current temperature of the fixing belt, by referring to the data of the second correlation.

In another aspect, the image forming apparatus 10 may include a program for calculating the rotation distance of the fixing belt required for eliminating creep, from the current temperature of the fixing belt. The program may be implemented as a program for executing an equation obtained by regression analysis of the data of the second correlation determined in advance by an experiment. The image forming apparatus 10 may calculate the rotation distance of the fixing belt required for eliminating creep, by inputting data of the current temperature of the fixing belt to the program.

The rotation distance of the fixing belt required for eliminating creep indicated by the second correlation is also explained as the minimum rotation distance required for eliminating creep. That is, the rotation distance indicated by the second correlation is also explained as the rotation distance for shortening the warm-up operation as much as possible while reliably eliminating creep. That is, the image forming apparatus 10 determines the rotation distance of the fixing belt in the warm-up operation, with reference to the second correlation, to thereby eliminate creep more reliably than the related art. Moreover, the image forming apparatus 10 may set the time for the warm-up operation as short as possible.

In the description with reference to FIG. 7, the image forming apparatus 10 sets the rotation distance of the fixing belt in the warm-up operation, based on the temperature of the fixing belt. That is, the image forming apparatus 10 adjusts only one parameter of the warm-up operation, based on the temperature of the fixing belt. However, this is merely an example, and the image forming apparatus 10 may adjust one or more parameters of the warm-up operation, based on the temperature of the fixing belt. The one or more parameters may include the rotation distance of the fixing belt, the rotation time of the fixing belt, the rotation speed of the fixing belt, and the target temperature of the fixing belt, for example. The image forming apparatus 10 adjusts one or more parameters of the warm-up operation, based on the temperature of the fixing belt. In this case, the data of the second correlation indicates a correlation between the temperature of the fixing belt and one or more parameters to be adjusted.

In an example, the image forming apparatus 10 may adjust the rotation distance or the rotation time of the fixing belt, based on the temperature of the fixing belt. In another example, the image forming apparatus 10 may adjust the rotation distance or the rotation time of the fixing belt and adjust the target temperature of the fixing belt, based on the temperature of the fixing belt. In another example, the image forming apparatus 10 may adjust the rotation distance or the rotation time of the fixing belt and adjust the rotation speed of the fixing belt, based on the temperature of the fixing belt. In still another example, the image forming apparatus 10 may adjust the target temperature of the fixing belt and the rotation speed of the fixing belt, based on the temperature of the fixing belt. In still another example, the image forming apparatus 10 may adjust the rotation distance or the rotation time of the fixing belt, adjust the target temperature of the fixing belt, and adjust the rotation speed of the fixing belt. In other words, some of one or more parameters may be fixed and some of the one or more parameters may be adjustable. Alternatively, all of the one or more parameters may be adjustable.

In an example, the second correlation may be implemented like a table 750. The table 750 includes respective items of a creep elimination time 751, a creep elimination distance 752, a creep time 753, and a nip position temperature 754. The item of the creep elimination time 751 represents one of parameters of the warm-up operation. The item of the creep elimination time 751 may correspond to the vertical axis of the graph 700. The item of the creep elimination distance 752 represents one of parameters of the warm-up operation. The item of the creep elimination distance 752 may correspond to the vertical axis of the graph 700. The item of the creep time 753 may indicate the elapsed time during which the fixing belt stopped. The item of the creep time 753 may correspond to the horizontal axis of the graph 600. The item of the temperature at the nip position 754 may indicate the temperature of the fixing belt at the nip position. The item of the temperature at the nip position 754 may correspond to the vertical axis of the graph 600 and the horizontal axis of the graph 700.

In an aspect, the table 750 may include other parameters such as the target temperature and the rotation speed, for example, of the fixing belt. In this case, the image forming apparatus 10 may refer to the table 750 to select a combination of one or more parameters corresponding to the current temperature of the fixing belt.

Figure 8:
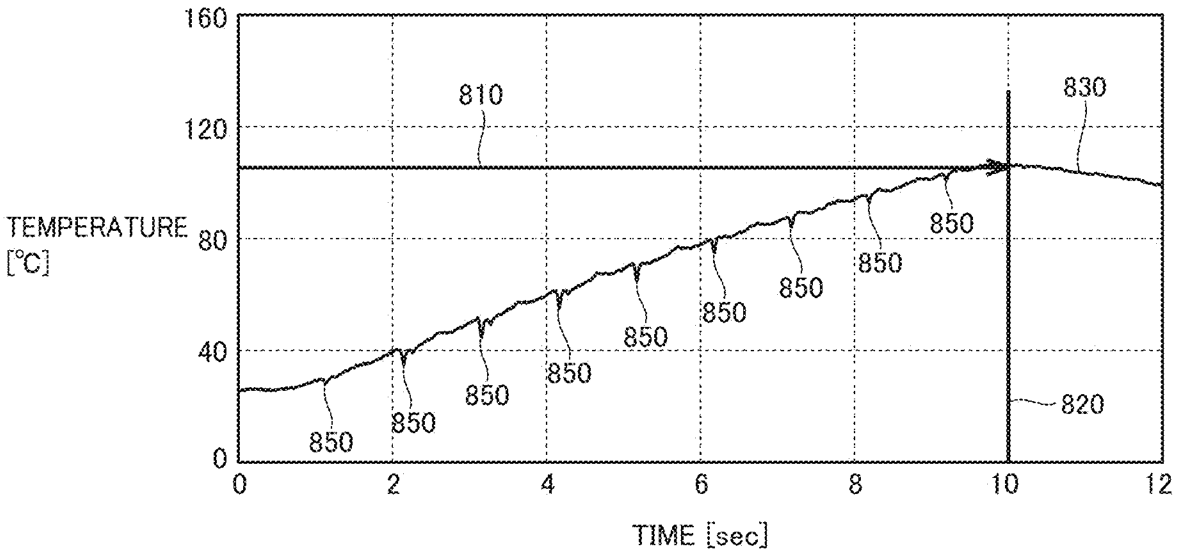
FIG. 8 is a diagram showing an example of how creep is eliminated by a warm-up operation.

FIG. 8 is a diagram showing an example of how creep is eliminated by a warm-up operation. Referring to FIG. 8, conditions for ending the warm-up operation is described. The horizontal axis in FIG. 8 represents the time of the warm-up operation or the rotation time of the fixing belt. The vertical axis represents the temperature of the fixing belt. A graph 830 indicates transition of the temperature of the fixing belt. The temperature of the fixing belt is measured by the temperature sensor 230, 330. A point 850 at which the temperature temporarily decreases, which is included in the graph 830, is the temperature of the fixing belt at the position where creep occurs.

As described above with reference to FIGS. 6 and 7, the image forming apparatus 10 determines one or more parameters of the warm-up operation, based on the temperature of the fixing belt. Then, the image forming apparatus 10 performs the warm-up operation, based on the determined one or more parameters.

In an example, it is assumed that the image forming apparatus 10 determines two parameters based on the temperature of the fixing belt. More specifically, it is assumed that the image forming apparatus 10 determines that the target temperature of the fixing belt is "110° C." Further, it is assumed that the image forming apparatus 10 determines that the rotation time of the fixing belt is "10 seconds." The rotation time of the fixing belt may also be read as the time for which the warm-up operation is performed. In this case, the image forming apparatus 10 ends the warm-up operation at the time when both of the conditions of the determined two parameters are satisfied. That is, the image forming apparatus 10 ends the warm-up operation at the time when the temperature of the fixing belt reaches "110° C." and the rotation time of the fixing belt reaches "10 seconds."

Referring to FIG. 8 by way of example, a threshold 810 represents the target temperature "110° C." of the fixing belt, which is one of the parameters. A threshold 820 represents the rotation time "10 seconds" of the fixing belt, which is one of the parameters. At the time when the graph 830 exceeds both of the thresholds 810 and 820, the image forming apparatus 10 ends the warm-up operation. After the graph 830 exceeds the thresholds 810 and 820, the point 850 at which the temperature temporarily decreases is not observed. That is, it is seen that the creep has been eliminated.

The parameters of the warm-up operation are the target temperature and the rotation time of the fixing belt in the above-described example, which, however, are merely an example. The parameters of the warm-up operation may include at least one or any combination of the target temperature, the rotation time, the rotation distance, and the rotation speed of the fixing belt.

As described above with reference to FIG. 8, the image forming apparatus 10 may determine one or more parameters of the warm-up operation, based on the temperature of the fixing belt. Then, when all of the determined one or more parameters are satisfied, the image forming apparatus 10 ends the warm-up operation. Since one or more parameters are also conditions to be satisfied, they may also be read as one or more target values. Thus, the image forming apparatus 10 may eliminate creep more reliably than the related art. Further, the image forming apparatus 10 may set the time of the warm-up operation as short as possible.

In an example, the image forming apparatus 10 may end the warm-up operation, in response to the fact that the target temperature and the rotation distance of the fixing belt are satisfied. In another example, the image forming apparatus 10 may end the warm-up operation, in response to the fact that the target temperature and the rotation time of the fixing belt are satisfied.

Further, as described above with reference to FIGS. 2 and 3, the image forming apparatus 10 includes the temperature sensor 230, 330 for measuring the temperature of the fixing belt. The controller of the image forming apparatus 10 may determine, based on the output signal from the temperature sensor 230, 330, whether the temperature of the fixing belt has reached the target temperature. The controller may be any of the controllers 150, 270, and 370.

Figure 9:
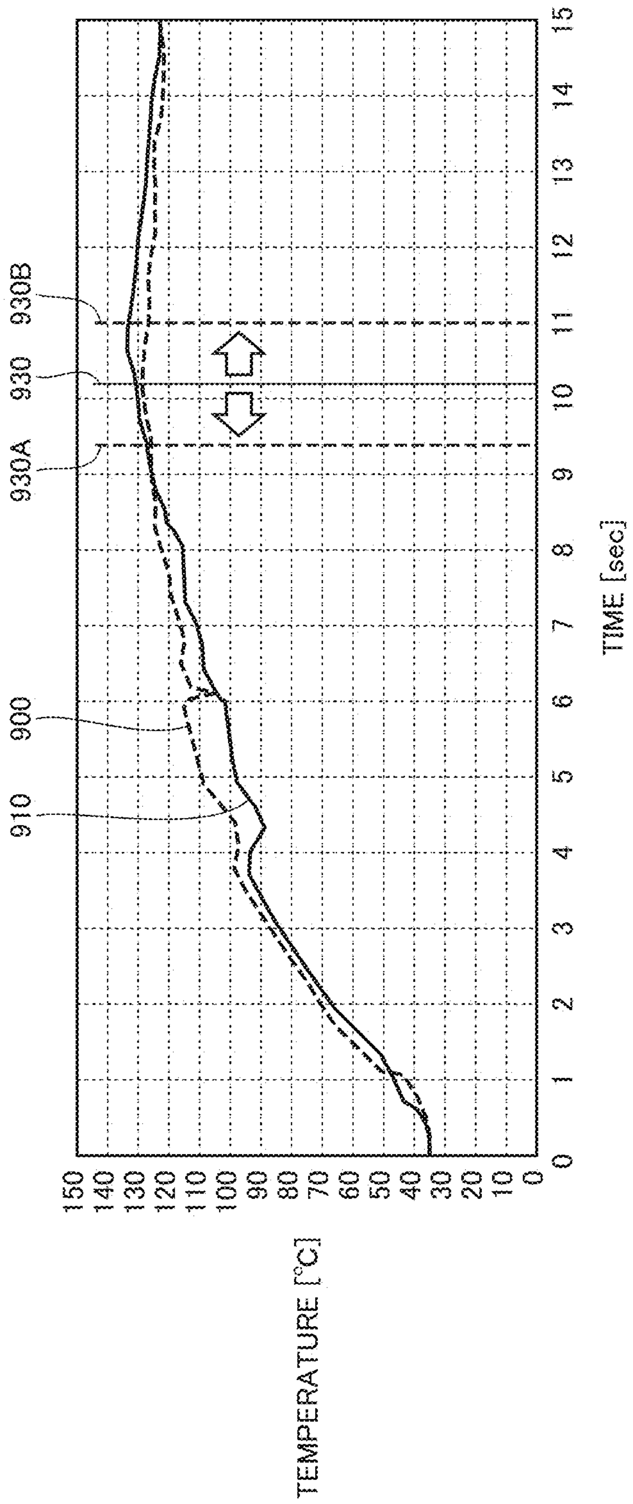
FIG. 9 is a diagram showing an example of adjustment of the execution period of the warm-up operation.

FIG. 9 is a diagram showing an example of adjustment of the execution period of the warm-up operation. The horizontal axis in FIG. 9 represents the execution period of the warm-up operation. The vertical axis represents the temperature of the fixing belt. A graph 900 indicates transition of the temperature of the fixing belt caused by a warm-up operation by the related art. A graph 910 indicates transition of the temperature of the fixing belt caused by the warm-up operation by the image forming apparatus 10. The end time 930 is a standard end time of the warm-up operation. The related art is not able to adjust one or more parameters of the warm-up operation based on the temperature of the fixing belt. Therefore, in the case of using the related art, the end time of the warm-up operation is always the end time 930.

In contrast, the image forming apparatus 10 may adjust one or more parameters of the warm-up operation, based on the temperature of the fixing belt. That is, the image forming apparatus 10 may adjust the warm-up operation period. The warm-up operation period may also be read as the rotation time of the fixing belt. In an example, when the temperature of the fixing belt is extremely low, the image forming apparatus 10 may extend the warm-up operation period to be longer than the usual one. In the example of FIG. 9, the image forming apparatus 10 may change the end time 930 of the warm-up operation to an end time 930B. Thus, the image forming apparatus 10 can eliminate the creep more reliably than in the related art. Conversely, when the temperature of the fixing belt is not too low, the image forming apparatus 10 can shorten the warm-up operation period than usual. In the example of FIG. 9, the image forming apparatus 10 can change the end time 930 of the warm-up operation to the end time 930A. Thus, the image forming apparatus 10 may perform the warm-up operation for a shorter time than the related art. In addition, the image forming apparatus 10 may adjust not only the warm-up operation period but also the target temperature of the fixing belt, unlike the related art.

As described above, the image forming apparatus 10 may flexibly change the warm-up operation period and the target time of the fixing belt, for example, based on the temperature of the fixing belt. As a result, the image forming apparatus 10 can eliminate creep more reliably and shorten the warm-up operation as much as possible, as compared with the related art. In an aspect, "based on the temperature of the fixing belt" may also be read as "based on the elastic modulus of the fixing belt."

D. Process Procedure of Image Forming Apparatus

Figure 10:
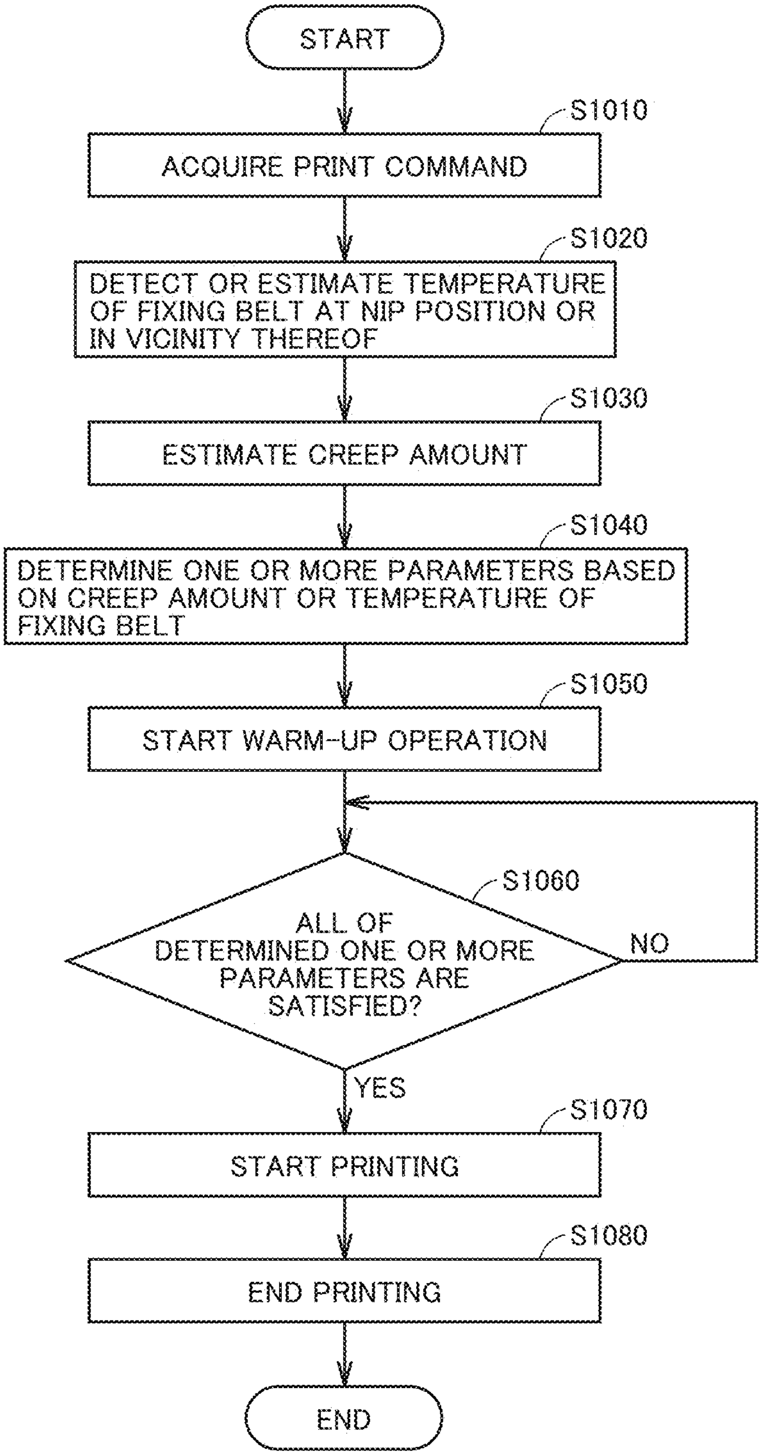
FIG. 10 is a diagram showing an example of an operation procedure of the image forming apparatus.

FIG. 10 is a diagram showing an example of an operation procedure of the image forming apparatus. In an aspect, any of the controllers 150, 270, and 370 may execute each process shown in FIG. 10. In another aspect, the controller 150 and the controller 270 may cooperate to execute each process shown in FIG. 10. In still another aspect, the controller 150 and the controller 370 may cooperate to execute each process shown in FIG. 10.

The controller that executes the process shown in FIG. 10 may read a program for performing the process in FIG. 10, from a storage or the like into a memory, and execute the program. Alternatively, a part or the whole of the process may be implemented as a combination of circuit elements configured to execute the process.

In step S1010, the image forming apparatus 10 acquires a print command. The print command may also be read as a print job. In an aspect, the image forming apparatus 10 may receive the print command from an operation panel of its main body. In another aspect, the image forming apparatus 10 may receive the print command from a user's terminal via a network.

In step S1020, the image forming apparatus 10 detects or estimates the temperature of the fixing belt at the nip position and in the vicinity of the nip position. That is, the image forming apparatus 10 detects or estimates the temperature at a position where the possibility of occurrence of creep of the fixing belt is high.

In step S1030, the image forming apparatus 10 estimates the creep amount. The creep amount represents the magnitude of distortion of the fixing belt. In an aspect, image forming apparatus 10 may have data of a correlation between the temperature of the fixing belt and the creep amount of the fixing belt. In this case, the image forming apparatus 10 may estimate the creep amount by referring to the data of the correlation. In another aspect, the image forming apparatus 10 determines one or more parameters of the warm-up operation, based on the temperature of the fixing belt. In this case, the image forming apparatus 10 may not perform the operation in step S1030.

In step S1040, the image forming apparatus 10 determines one or more parameters of the warm-up operation based on the creep amount. Alternatively, the image forming apparatus 10 determines one or more parameters of the warm-up operation, based on the temperature of the fixing belt. The one or more parameters include one or more of the target temperature, the rotation time, the rotation distance, and the rotation speed of the fixing belt. Further, a part of these parameters may each be a fixed value.

In step S1050, the image forming apparatus 10 starts the warm-up operation. In some cases, the image forming apparatus 10 successively receives the print command. Therefore, in the case where creep has not occurred in the fixing belt, the image forming apparatus 10 is not required to perform the warm-up operation. In an example, the image forming apparatus 10 may determine whether or not creep has occurred, from the temperature of the fixing belt.

In step S1060, the image forming apparatus 10 determines whether all of the determined one or more parameters have been satisfied. Since one or more parameters are also conditions to be satisfied, the one or more parameters may also be read as one or more target values. In an example, the image forming apparatus 10 may determine whether both of the target temperature and the rotation time of the fixing belt have been satisfied. In another example, the image forming apparatus 10 may determine whether both of the target temperature and the rotation distance of the fixing belt have been satisfied. When the image forming apparatus 10 determines that all of the one or more determined parameters have been satisfied (YES in step S1060), the image forming apparatus 10 makes the control proceed to step S1070. Otherwise (NO in step S1060), the image forming apparatus 10 makes the control proceed to step S1060.

In step S1070, the image forming apparatus 10 starts a print process. That is, the image forming apparatus 10 starts a process for printing an image on a medium 160. In step S1080, the image forming apparatus 10 ends the printing process.

E. Summary

As described above, the image forming apparatus 10 according to the present embodiment may adjust or determine one or more parameters of the warm-up operation, based on the temperature of the fixing belt. Alternatively, the image forming apparatus 10 may adjust or determine one or more parameters of the warm-up operation, based on the creep amount. Thus, the image forming apparatus 10 can eliminate creep more reliably than the related art. Further, the image forming apparatus 10 can set the time of the warm-up operation as short as possible.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:

a fixing section that fixes toner to a medium; and a controller that controls the fixing section, wherein the fixing section includes a pressure roller and a fixing belt, the fixing belt nips the medium, together with the pressure roller, and causes the medium to be heated at a nip position where the medium is nipped, and the controller estimates a temperature of the fixing belt at the nip position or in a vicinity of the nip position, from an operation history of the fixing section, without detecting the temperature, and determines one or more parameters of a warm-up operation for heating the fixing belt, based on the estimated temperature of the fixing belt at the nip position or in the vicinity of the nip position.

2. The image forming apparatus according to claim 1, wherein the one or more parameters include one or more of a target temperature of the fixing belt, a rotation distance of the fixing belt, a rotation speed of the fixing belt, and a rotation time of the fixing belt, and determining the one or more parameters includes determining a part or all of the one or more parameters.

3. The image forming apparatus according to claim 2, wherein another parameter of the warm-up operation is fixed and is not determined by the controller.

4. The image forming apparatus according to claim 2, wherein the controller ends the warm-up operation, in response to satisfaction of the target temperature and the rotation distance of the fixing belt, or satisfaction of the target temperature and the rotation time of the fixing belt.

5. The image forming apparatus according to claim 4, further comprising a temperature sensor that measures the temperature of the fixing belt, wherein the controller determines, based on an output signal of the temperature sensor, whether the temperature of the fixing belt has reached the target temperature.

6. The image forming apparatus according to claim 1, wherein estimating the temperature of the fixing belt at the nip position or in the vicinity of the nip position, from the operation history of the fixing section, includes estimating the temperature of the fixing belt at the nip position or in the vicinity of the nip position, based on at least a stoppage time of the fixing section.

7. The image forming apparatus according to claim 1, wherein estimating the temperature of the fixing belt at the nip position or in the vicinity of the nip position, from the operation history of the fixing section, includes estimating the temperature of the fixing belt at the nip position or in the vicinity of the nip position, based on at least a turn-off time of a heater of the fixing section.

8. A fixing device capable of being incorporated in an image forming apparatus, the fixing device comprising:

a fixing belt that fixes an image to a medium by causing the medium to be heated;

a pressure roller that applies a pressure to the medium; and a controller that controls the fixing device, wherein the fixing belt nips the medium, together with the pressure roller, and causes the medium to be heated at a nip position where the medium is nipped, and the controller estimates a temperature of the fixing belt at the nip position or in a vicinity of the nip position, from an operation history of the fixing device, without detecting the temperature, and determines one or more parameters of a warm-up operation for heating the fixing belt, based on the estimated temperature of the fixing belt at the nip position or in the vicinity of the nip position.

* * * * *